Feb. 3, 1942.   W. M. MANSFIELD   2,271,741
PITMAN BEARING
Filed April 25, 1939   2 Sheets-Sheet 1

WARREN M. MANSFIELD,
INVENTOR.
BY
ATTORNEY

Feb. 3, 1942.    W. M. MANSFIELD    2,271,741
PITMAN BEARING
Filed April 25, 1939    2 Sheets-Sheet 2
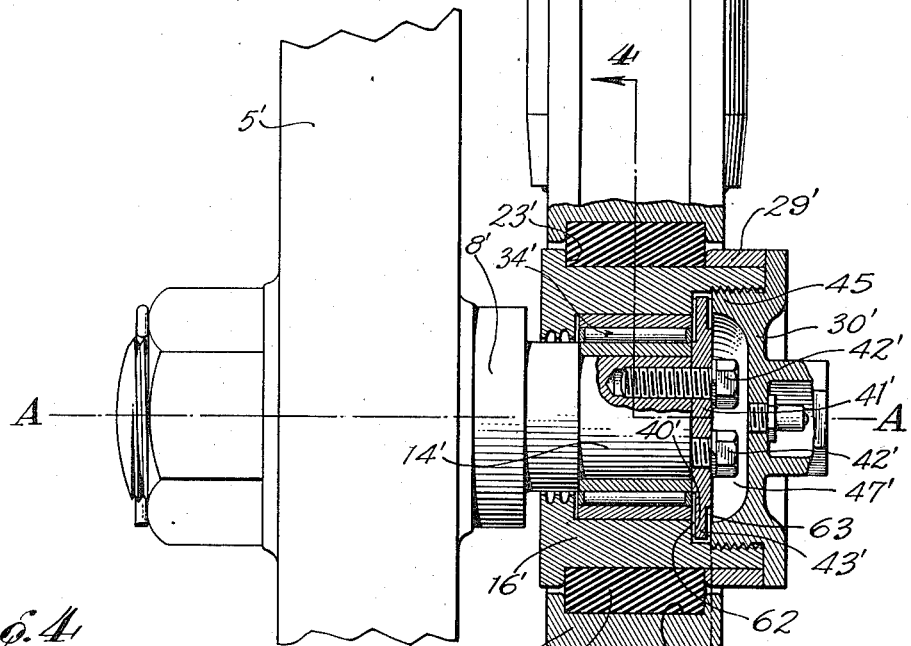
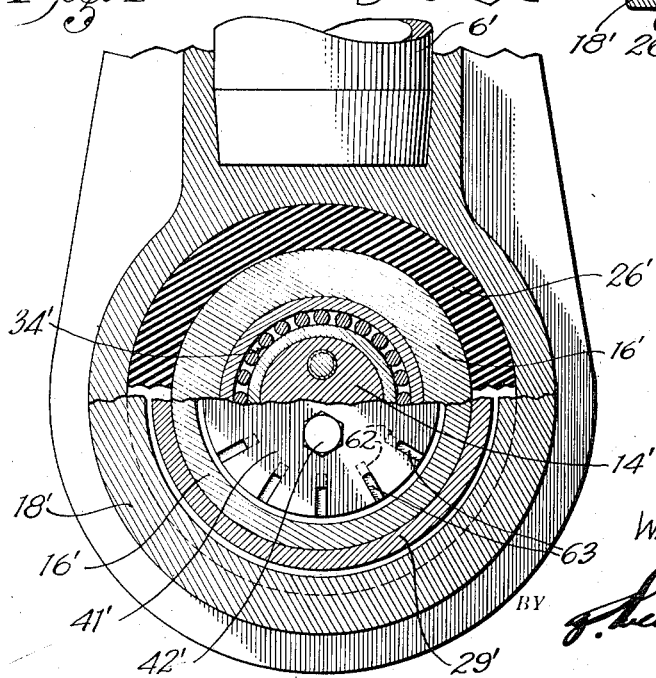
WARREN M. MANSFIELD,
INVENTOR.
BY
ATTORNEY Patented Feb. 3, 1942

2,271,741

UNITED STATES PATENT OFFICE 2,271,741

PITMAN BEARING

Warren M. Mansfield, Glendale, Calif., assignor to Emsco Derrick & Equipment Company, Los Angeles, Calif., a corporation of California Application April 25, 1939, Serial No. 269,927

5 Claims. (Cl. 308—163)

This invention relates in general to bearings for connecting relatively rotatable parts and relates in particular to a bearing which may be used to connect a rotary crank to the walking beam pitman of oil well operating equipment.

To indicate the principal utility of the present invention, it may be pointed out that in the operation of a walking beam, such walking beam is connected through a link or pitman with a rotatable crank. It is found that during the reciprocation of the walking beam on its bearing, there is more or less lateral swinging movement so that the pitman does not always lie in a plane perpendicular to the axis of rotation of the crank. This condition may also be caused by the axis on which the walking beam swings being non-parallel to the axis of rotation to the crank. This non-radial swinging movement of the pitman places severe strains on the pitman-crank bearing, with a result that the bearing is in some instances rapidly broken down.

It is an object of my present invention to provide a pitman bearing so formed and supported that a small amount of non-radial swinging movement of the pitman, relative to the axis of the crank pin, will not place disruptive strains on the pitman bearing.

It is an object of the invention to provide a bearing means for connecting a crank member and a pitman member, this bearing means embodying a journal which connects the two members and is rotatable relative to at least one of these members and is also supported for a nonradial swinging movement relative to one of the members.

A further object of the invention is to provide a bearing means for connecting a crank member and a pitman member, comprising a pin projecting from one of the members and having a journal portion which projects into a shell carried by the other of the members, there being resilient supporting means in the shell and cooperative bearing means for permitting relative rotation of the journal and shell and likewise a reasonable degree of non-radial swinging movement of the member which carries the shell.

A further object of the invention is to provide a simple and effective construction embracing a sleeve which projects through the opening of the shell and is supported in the shell by rubbery material, this sleeve receiving the journal of the crank pin and having therein radial and thrust bearing means of simple character and which may be readily and amply lubricated.

A further object of the invention is to provide bearing means of the character set forth in the preceding paragraph wherein the sleeve of the bearing structure is supported in the shell by means of a cylindrical body of rubbery material, such for example as rubber, rubber compound, or an elastic material having the general characteristics of rubber.

Further objects referring to the drawings:

Fig. 3 is a fragmentary partly sectioned view showing an alternative form of the invention.

Fig. 4 is a section taken as indicated by the line 4—4 of Fig. 3.

Figures 1, 2:
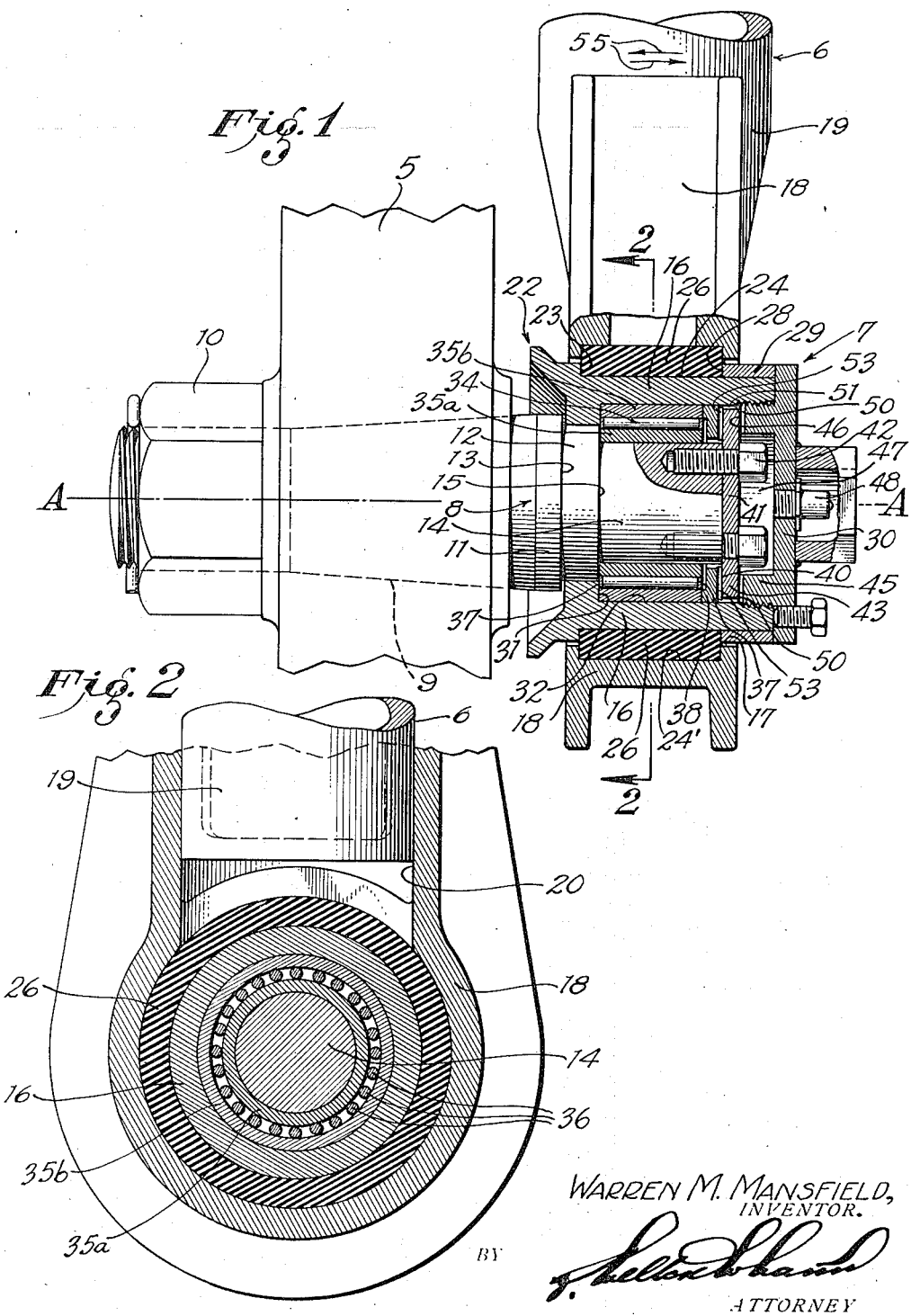
Fig. 1 is a partly sectioned fragmentary view of a preferred form of my invention.
Fig. 2 is a fragmentary section taken as indicated by the line 2—2 of Fig. 1.

In Fig. 1 I show connected relatively rotatable members, namely, a crank arm 5 for the pitman 6. These members 5 and 6 are connected by bearing means 7 so that they may have relative rotation on the axis A—A. It will be understood that the bearing means might be reversed from the position in which it is shown, although it is preferable to have the crank pin 8 of the bearing means rigidly secured in the crank arm 5 and to have the crank pin therein within the opening provided therefor in the end of the pitman 6.

The crank pin 8 is shown with a tapered portion 9 which projects through a cooperating opening in the crank arm 5 and is rigidly secured by use of a nut 10. The projecting portion of the crank pin 8 has a large section 11 adjacent which a smaller section 12 lies and from which the smaller section 12 is separated by means of a shoulder 13. Adjacent the section 12 the pin is further reduced in diameter so as to provide a journal 14 separated from the section 12 by a shoulder 15.

The journal 14 projects within a sleeve 16 which in turn extends through an opening 17 formed in a casing or shell 18 carried by the end 19 of the pitman 6. This member 18, referred to as the shell, may be a steel casting having in perpendicular relation to the opening 17, an opening or space 20 which receives the lower end 19 of the pitman 6, which may consist of a length of pipe, the portion 19 being preferably welded in the opening 20 of the shell 18.

The sleeve 16 has at its front end 22 an enlargement forming a shoulder 23. From the shoulder 23 the sleeve 16 has a cylindrical portion 24 which extends rearward through the opening 17 of the shell 18. Within the opening 17 of the shell 18 there is an internal annular recess 24 of a size to receive and retain a supporting means 26 preferably comprising a cylindrical body of rubbery material or other material having suitable elasticity and durability. The ring 26 is first placed in the internal recess 24, after which the cylindrical portion 24 of the sleeve 16 may be passed through the opening of the ring 26 in rearward or rightward direction. Removal of the sleeve 16 from the ring 26 is thereafter prevented by a radial shoulder 28 which may be provided by a ring or cylinder 29 on the rightward end of the sleeve, as by means of a detachable cover member 30.

The sleeve 16 has at its front end a stop shoulder 31 which faces toward the rear end of the sleeve 16; the sleeve 16 is likewise provided with a counterbore 32 leading inward from the rear end thereof. Within the sleeve 16, bearing means is provided for the journal 14 of the crank pin 8, such bearing means preferably comprising a roller type bearing 34 having an inner race 35a surrounding the journal 14, an outer race 35b in the sleeve and abutting the stop shoulder 31, and suitable rollers 36, guided, if desired, by a suitable catch or by end rings 37. A ring 38 is disposed at the right end of the bearing means 34, the rightward face 40 of this ring 38 forming a thrust shoulder within the counterbore 32 of the sleeve 16. To provide thrust bearing means to limit the axial movement of the journal 14 relative to the sleeve 16, a circular plate 41 is secured by screws 42 to the end of the journal 14, this plate 41 having a radially projecting peripheral portion 43 lying adjacent to the face 40 of the ring 38. To limit movement of the plate 41 in one direction within the sleeve 16, the cover 30 is provided with an inwardly projecting annular wall or rib 45 which makes threaded engagement with the sleeve 16 and has an inner end face 46 presented to the rightward face of the peripheral portion 43 of the plate 41.

The cover 30 closes the rear end of the sleeve 16 and forms therein a lubricant chamber 47 into which grease may be forced through a grease fitting 48. So that the grease may pass from the chamber 47 to both the radial and thrust bearing faces, the inner end of the annular wall 45 is provided with radial grooves 50, space 51 is provided between the periphery of the plate 41 and the wall of the sleeve 16, and suitable grooves 53 are formed in the surfaces of the ring 38. The grease is distributed to both front and rear portions of the radial extending wall 43 and to the roller type bearing 34.

The crank 5 and the pitman 6 may have relative rotation on the axis A—A due to the turning of the sleeve 16 on the journal 14, and the pitman 6 may have a swinging movement in a non-radial direction, that is to say, in the directions indicated by the arrows 55 of Fig. 1, which may lie in a plane coinciding with the axis A—A. As this relative non-radial swinging movement of the pitman occurs the rubbery material of the ring 26 will yield, and the said relative swinging movement may occur without placing disruptive loads on the bearings operating between the sleeve 16 and the journal 14. The enlargement is expanded so as to form a lip from which will be thrown any grease that leaks out around the annular section 12 of the pin 8. Accordingly, any lubricant which leaks from the bearing of the device will be diverted so as not to reach and cause deterioration of the ring 26.

In the alternative form of the device shown in Figs. 3 and 4, I show a crank 5' carrying a crank pin 8' which extends into a cylindrical member or sleeve 16' equipped with a cover member 30'. This cover member 30' has a radially projecting rim which holds on the sleeve 16' a ring 29' to retain an annular member 26' of rubbery material in place against a shoulder 23' at the front end of the sleeve 16'. The outer peripheral portion of the member 26' is received in a suitable channel 24' formed in a shell 18' formed on or secured to the end of a pitman 6'.

The principal difference of this form of the invention is that the shoulder 40' in the sleeve 16' against which the thrust member 43' operates, is formed in the sleeve 16' instead of by the use of an inserted ring 38 as shown in Fig. 1. The thrust member 43' consists of the peripheral portion of a circular plate 41' secured to the end of the journal 14' of the crank pin 8' by means of screws 42'. Thrust member 43' has grease passages comprising grooves 62 and 63 in the faces thereof so that grease may pass from the grease chamber 47' in the cap or cover 30' to the bearing means 34' disposed in operative position between the journal 14' and the sleeve 16'. The annular wall 45' of the cover member 30' has the inner end thereof faced off smooth to form a thrust bearing face to cooperate with the rightward face of the thrust member 43'. In this alternative form of the invention, the journal 14' may rotate freely in the sleeve 16' on the axis A—A, and the supporting member 26' of rubbery material permits the pitman 6' to swing through limited distances in a plane coinciding with the axis A—A.

I have herein shown simple and practical embodiments of my invention. Certain parts or elements thereof may be replaced by other parts or elements of equivalent function without departing from the spirit of the invention; therefore, the invention is not limited to the details set forth herein, but should be accorded the full scope of the appended claims.

I claim as my invention:

1. In a bearing device of the character described, the combination of: a sleeve having a bore with a stop shoulder near the forward end thereof and a counterbore in the rear end thereof having a bottom shoulder; a journal extending into said sleeve through said forward end thereof; a radially projecting thrust member secured on said journal in a position to lie adjacent said bottom shoulder in said counterbore; bearing means for said journal in said sleeve between said stop shoulder and said thrust member; a cover for the rear end of said sleeve; and a thrust bearing element held by said cover in a position adjacent the side of said thrust member opposite from said shoulder, said cover enclosing a lubricant chamber in the rear end of said sleeve, there being passage means for conducting lubricant from said lubricant chamber to said bearing means.

2. In a bearing device of the character described, the combination of: a sleeve having a bore with a stop shoulder near the forward end thereof and a counterbore in the rear end thereof having a bottom shoulder; a journal extending into said sleeve through said forward end thereof; a radially projecting thrust member secured on said journal in a position to lie adjacent said shoulder in said counterbore; bearing means for said journal in said sleeve between said stop shoulder and said thrust member; and a cover for the rear end of said sleeve; and a thrust bearing held by said cover in a position lying adjacent the side of said thrust member opposite from said shoulder, said cover enclosing a lubricant chamber in the rear end of said sleeve, there being passage means for conducting lubricant from said lubricant chamber to said bearing means, said passage means being formed in part by said thrust member so that a part of the lubricant will be applied to said thrust element.

3. In a bearing device of the character described, the combination of: a sleeve having a bore wtih a stop shoulder near the forward end thereof and a counterbore in the rear end thereof having a bottom shoulder; a journal extending into said sleeve through said forward end thereof; a disc secured to the end of said journal so as to provide a thrust member projecting radially from said journal in a position to lie adjacent said shoulder in said counterbore; bearing means for said journal in said sleeve between said stop shoulder and said thrust member; and a cover for the rear end of said sleeve; and a thrust bearing element held by said cover in a position lying adjacent the side of said thrust member opposite from said shoulder, said cover enclosing a lubricant chamber in the rear end of said sleeve, there being passage means for conducting lubricant from said lubricant chamber to said bearing means, said passage means being formed in part by said thrust member so that a part of the lubricant will be applied to said thrust element.

4. In a bearing structure, the combination of: an outer bearing element having a journal receiving opening from the front to the rear end thereof; a journal member having an outer portion lying outside the front end of said opening and an inner portion extending through the front end of said opening to a point near the rear end of said outer bearing element; a radial thrust flange projecting from the rear of said inner portion of said journal member; a thrust bearing ring in said outer bearing element to engage the front face of said flange; a closure for the rear end of said opening; and a thrust bearing ring held by said closure in the rear end of said opening to engage the rear face of said flange, said cover enclosing a lubricant chamber in the rear end of said outer bearing element, there being passage means for conducting lubricant from said chamber to the opposite side of said flange whereby lubricant fed into said chamber may pass to the front portion of said opening.

5. In a bearing structure, the combination of: an outer bearing element having a journal receiving opening from the front to the rear end thereof; a journal member having an outer portion lying outside the front end of said opening and an inner portion extending through the front end of said opening to a point near the rear end of said outer bearing element; a radial thrust flange projecting from the rear of said inner portion of said journal member; a thrust bearing ring in said outer bearing element to engage the front face of said flange; a closure for the rear end of said opening; and a thrust bearing ring held by said closure in the rear end of said opening to engage the rear face of said flange, said cover enclosing a lubricant chamber in the rear end of said outer bearing element, there being passage means for conducting lubricant from said chamber to the opposite side of said flange whereby lubricant fed into said chamber may pass to the front portion of said opening, said passage means being formed in part by said thrust flange and said thrust bearing rings.

WARREN M. MANSFIELD.